United States Patent
Anderson et al.

[15] 3,680,121
[45] July 25, 1972

[54] MOBILE LOCATOR SYSTEM FOR METROPOLITAN AREAS

[72] Inventors: Roy E. Anderson, Schenectady, N.Y.; Miguel A. Merigo, Lynchburg, Va.

[73] Assignee: General Electric Company

[22] Filed: Jan. 2, 1970

[21] Appl. No.: 361

[52] U.S. Cl. ................................343/112 TC, 343/6.5 LC
[51] Int. Cl. .........................................................G01s 5/02
[58] Field of Search................343/105, 112 TC, 6.5 LC, 7.5

[56] References Cited
UNITED STATES PATENTS

| | | | |
|---|---|---|---|
| 3,419,865 | 12/1968 | Chisholm | 343/112 TC |
| 3,474,460 | 10/1969 | Huebscher | 343/6.5 LC |
| 3,206,751 | 9/1965 | Knight | 343/105 |
| 3,518,674 | 6/1970 | Moorehead et al. | 343/112 TC |

Primary Examiner—Carl D. Quarforth
Assistant Examiner—J. M. Potenza
Attorney—John F. Ahern, Paul A. Frank, Julius J. Zaskalicky, Frank L. Neuhauser, Oscar B. Waddell and Joseph B. Forman

[57] ABSTRACT

A locator system is disclosed wherein the vehicle whose location is unknown transmits a short, modulated radio frequency pulse. Receiving stations about the periphery of the area being serviced phase compare the received signal with a standard time reference signal. The phase difference is used to determine the arrival time differences at the known locations of the receiving stations from which the location of the vehicle may be determined. The wavelength of the modulating signal is generally greater than the maximum distance encountered in the service area. The effects of multipath reflections are minimized by utilizing a space dispersed antenna.

12 Claims, 4 Drawing Figures

PATENTED JUL 25 1972

Inventors:
Roy E. Anderson,
Miguel A. Merigo,
by Paul A. Frank
Their Attorney.

Inventors:
Roy E. Anderson,
Miguel A. Merigo,
by Paul A. Frank
Their Attorney.

MOBILE LOCATOR SYSTEM FOR METROPOLITAN AREAS

The present invention relates to a method of and apparatus for locating mobile transmitters within a certain area. In particular, the invention relates to a method for locating police, emergency, and service vehicles within metropolitan areas.

Police departments of many cities have indicated a need for monitoring the locations of patrol cars throughout the city so that they can improve the efficiency of their dispatching. Other services such as cab and bus companies also have requirements for tracking the location of their vehicles. In fulfilling the requirements of these municipal and service organizations, a vehicle locating system must be low in cost, compatible with existing mobile communications, versatile, and unaffected by radio noise in the vicinity of the vehicle.

In view of the above, it is an object of the invention to provide a relatively simple, low cost method for locating a number of vehicles in a defined area.

A further object of the invention is to provide a simple, low cost system to locate vehicles in a metropolitan area with sufficient accuracy.

Another object of the present invention is to provide a vehicle locating system that adds as little additional apparatus to existing communication facilities as possible.

A further object is to provide a vehicle locating system for use in metropolitan areas wherein the effects of multipath reflections and radio frequency noises are minimal or eliminated.

Another object of the present invention is to provide a vehicle locating technique that may be implemented by apparatus as simple or complex as the needs or wants of the user require.

The foregoing objects are achieved in the present invention wherein there is provided in a typical installation, four receiving stations located approximately at the corners of a square encompassing the area to be served. Timing references, provided at each of the receiving stations, are in precise relation to each other within one or two tenths of a microsecond. When a transmitter is to be located, it transmits a relatively short tone burst of an audio frequency whose modulating wavelength in space may be longer than the largest dimension of the service area. The tone burst is received at each of the receiving stations and each one measures the phase of the audio frequency tone burst relative to the reference phase. A number representing the phase difference between the received tone burst and the reference phase is transmitted by any convenient means to a central station. Alternatively, the received tone may be retransmitted by microwave link from each of the receiving stations to the central station where phase comparisons can be made. The differences in phase, taking into account the absolute time differences between the references at the receiving stations, is used to determine the time differences of arrival at the known locations of the receiving stations. From these data, hyperbolic lines of position are determined and their intersection is the location of the transmitter. Errors introduced by multipath reflections are minimized by utilizing a spaced dispersed antenna.

The timing references provided at each of the receiving station may comprise the synchronization signals received from a local television station. This would provide a convenient, satisfactory, and inexpensive time base for all receiving stations. Alternatively, a microwave link or atomic clocks can be used to provide the time base.

There are numerous ways to initiate the transmission of the tone burst from the vehicle. It may be done on a programmed basis or on a random access basis with an identification of the vehicle transmitted with the tone burst. It may also be done by interrogation from the central station, either automatically or by voice request.

As outlined above, the vehicle locating system achieves a low initial and operating cost since the vehicle needs only an audio frequency tone burst generator added to the conventional mobile radio equipment. The receiving stations can use slightly modified mobile receivers. When television synchronizing signals are utilized, there is no need for a separate source of a time reference signal. The system is compatible with existing mobile radio communications since the tone burst can be transmitted within the bandwidth used for mobile communications. Thus, existing vehicle equipment can be used with minor additional circuitry. The time for the transmission can be relatively short so that it adds little to the communication load on the channel. Further, the system is unaffected by radio noise in the vicinity of the vehicle since one-way transmissions from the vehicle are used for the measurement. The accuracy is unaffected by radio frequency interference in the receiver of the vehicle as it would be if a two-way transponding system were used.

The various features and advantages of the invention may be best understood by considering the following detailed description in conjunction with the attached drawings in which.

Figure 1:
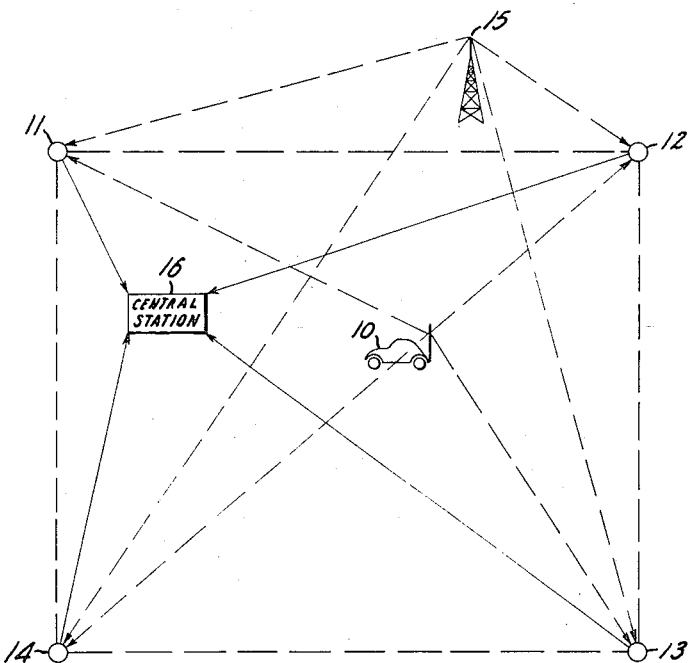
FIG. 1 represents a sketch of the invention in use in a metropolitan area.

Referring to FIG. 1, there is shown the over-all operation of the present invention wherein the vehicle locating system uses range difference measurements to determine hyperbolic lines of positions for vehicle location. When a vehicle, such as vehicle 10, is to be located, a control center transmits an interrogation signal to the vehicle. Several options are available for transmitting the interrogation. The operator of the system may use the option that best suits his needs. The vehicle may be addressed automatically by a special code that is exclusively part of the location system, by means of a selective calling equipment that is part of the communication system, or the vehicle driver may be requested by voice to initiate a ranging signal manually. Alternatively, each vehicle may initiate its own ranging signal transmission according to a programmed sequence, timed by a clock on the vehicle. The ranging signal transmitted by the vehicle 10 to the receiving stations 11–14 may consist of a short tone burst at a frequency of approximately 3,150 Hz, frequency modulated onto the carrier of the voice communication transmitter. The duration of the tone burst may be approximately 100 cycles, or 0.03 seconds. The duration is determined by the accuracy requirements and the signal-to-noise ratio. Frequency deviation is limited to keeping the radio frequency spectrum within the mobile radio channel bandwidth assignment. No other signal need be transmitted by the vehicle to determine its location. The only device needed on the vehicle in addition to its normal communication equipment is an audio oscillator of modest stability to modulate the communication transmitter, and a means to initiate the transmission of the short tone burst.

A minimum of three receiving stations is necessary and a fourth is recommended to insure ambiguity resolution and to provide a redundant measurement. The separation of the receiving stations is determined by the useful range of the mobile equipment in the particular metropolitan area. In dense areas, separations as short as 2 miles may be required. In suburban areas, separation may be as much as 10 miles. Locations of the receiving stations 11–14, relative to each other, should be approximately at the apices of an equi-lateral triangle or the corners of a square. They cannot lie in a straight line.

The receiving stations 11–14 are provided with a common time base with a precision better than approximately 200 nanoseconds relative to each other. Synchronization signals such as received from a local television station 15 can provide the time base for all of the receiving stations. Alternatively, a microwave link or atomic clocks can be used to provide the time base.

When a television signal is used, the horizontal synchronization pulses provided precise timing resolution and the vertical synchronization pulses provide ambiguity resolution. Precise timing pulses at a rate of 3,150 per second are derived from the television synchronization pulses by selection of every fifth horizontal pulse. Selection of the individual horizontal synchronization pulses are timed from the vertical synchronization pulses. All of the receiving stations 11–14 have the same time base but displaced relative to each other by the difference in propagation time from the television transmitter 15 to the receiving stations. This difference in propagation time is a constant and can be determined by calculation and calibration.

When the ranging signal from the vehicle is received at each of the receiving stations 11–14, a gate is opened at each zero crossing of the received 3,150 Hz tone, and closed at the next following time base pulse. While the gate is open, pulses at a frequency of 10 MHz are passed through. A separate counter counts the number of times the gate is open. After a fixed number of times, for example, 64, the gate is no longer opened by the received tone zero crossings. The total number of 10 MHz pulses is counted to provide a measure of phase difference between the received tone zero crossings and the time base pulses averaged over a number of cycles determined by separate counter. This gated counter phase measuring or range determining technique is conventional and therefore is not illustrated. Further, any suitable phase measuring technique may be used. The timing resolution may be improved by using a frequency higher than 10 MHz for timing the intervals and the precision may be improved by averaging over a large number of received cycles.

When phase difference has been determined at each of the receiving stations, it can be expressed as a number in binary digital form, which is then transmitted by any convenient means, such as telephone lines, from each receiving station 11–14 to a central processing facility 16. The measurements are corrected by the known relative displacement of the time bases, their differences taken, the hyperbolic lines of position computed, and the location of the vehicle is thus determined. An ambiguity exists for each range measurement at the period of the Hz frequency. The period is 320 microseconds, representing a distance of approximately 16 miles. Since this is larger than the maximum separation of the receiving stations, the ambiguity is easily resolved.

Figure 2:
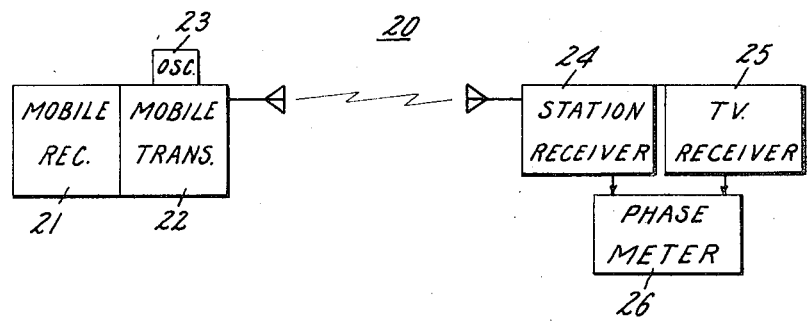
FIG. 2 illustrates one embodiment of the present invention utilizing existing communication equipment as much as possible.

Referring to FIG. 2, there is illustrated a mobile communication system 20 modified in accordance with the present invention to carry out the additional function of vehicle location. In the conventional mobile communication system a mobile receiver 21 and transmitter 22 are carried on the vehicle whose location needs to be determined. The receiving station 24 receives the signals from the mobile unit 21 and 22. In accordance with the present invention, an audio oscillator 23 is added to the mobile transmitter 22 in order to provide the tone burst signal so that its location may be determined. At the receiving station, there is additionally provided a television receiver 25 for receiving the horizontal and vertical synchronization signals from the local television station 15. The addition of oscillator 23 and television receiver 25 represent the sole modifications that need be made to the existing communication system. The received signals from receiver 24 and television receiver 25 are then phase compared in phase meter 26 which then transmits the phase difference between the two received signals to the central station 16 as illustrated in FIG. 1. At the central station 16 the signals from the receiving stations 11–14 are processed by any suitable means and the vehicle location is determined.

Figure 3:
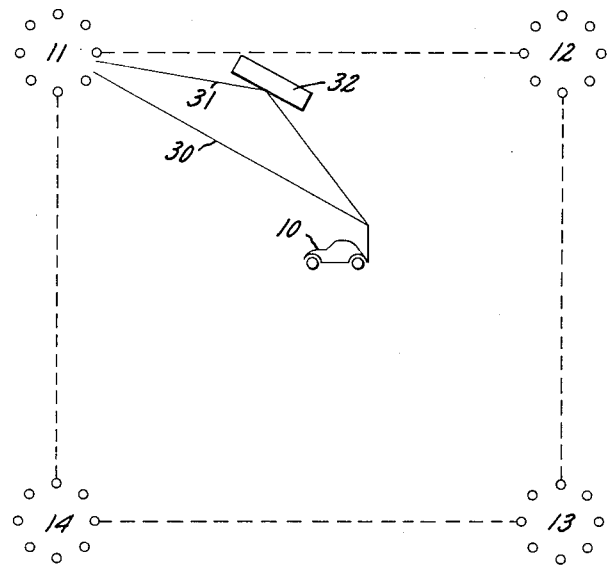
FIG. 3 illustrates one form of space dispersed antenna system used in carrying out the present invention.

In FIG. 3 there is illustrated one form of an antenna system useful in the present invention to minimize the effects of multipath reflections. In a metropolitan area the signal transmitted from the vehicle 10 will not merely follow a line-of-sight path 30 but will also be reflected by buildings in the area such as building 32. The signal from the vehicle 10 will be reflected along path 31 to the receiving station 11. Having a single receiving antenna at the receiving station 11, the signals travelling along paths 30 and 31 will combine and the net received signal will be phase displaced relative to the signal travelling along path 30. The result of this is to indicate an erroneous value for the range of vehicle 10 from the receiving station 11. It has been found that the range error is bidirectional, that is, it may either be a positive or negative error. It has been found further that the error varies cyclically such that over one whole cycle the average range error approaches zero. If a single antenna at receiving station 11 is moved about as the signals along paths 30 and 31 are received, the average of the readings at the various positions will tend to average out to the true value for the range of vehicle 10 from receiving station 11. One means of implementing this averaging feature is illustrated in FIG. 3 wherein a spaced dispersed antenna system is utilized at each of the receiving stations 11–15. Thus, for example, at receiving station 11 a plurality of antennae are utilized to receiving station 11 a travelling along paths 30 and 31. The signals received at each antenna may be manipulated in any desired manner, for example, they may be sequentially sampled or summed or a combination of summing and sampling can be used. By utilizing a space dispersed antenna system such as shown in FIG. 3, the received signals over path 30 and 31 are averaged out and the resulting determination of range is more accurate than that which could be obtained using a single receiving antenna.

Figure 4:
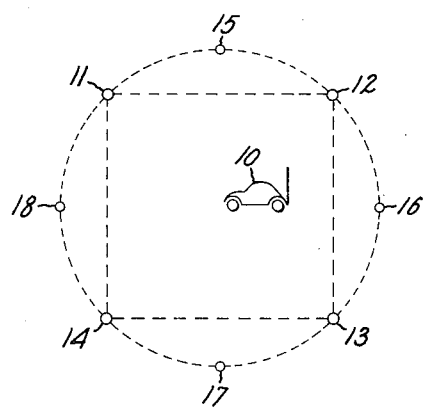
FIG. 4 illustrates another form of a dispersed antenna system useful in carrying out the present invention.

In FIG. 4 there is illustrated an alternative form of dispersed antenna system, wherein a plurality of antennae are located about the area to be served and form a single dispersed antenna array comprising antennae 11–18. At each antenna is a separate receiving station which processes the signal from the vehicle-to-be-located 10 and the locally generated time signal to determine the range of the vehicle to be located from the receiving station. The antenna system of FIG. 4 may be considered more of a redundant measurement system wherein a relatively large number of measurements are made and combined to average out the range error due to multipath reflection.

While a specific embodiment of the invention has been described, it will be obvious to those skilled in the art that numerous modifications of the invention may be made. For example, the received signals at stations 11–14 may be relayed by any suitable means to a central station 16 where they are then phase compared with the signal from the local television station 15 to determine the relative phase displacement of the signals received at the receiving stations 11–14, and from which the location of the vehicle 10 may be determined. In this modification, all the processing equipment is then located at a central station.

What we claim as new and desire to secure by Letters Patent of the United States is:

1. A method for locating a vehicle comprising the steps of
positioning at least three receiving stations about the periphery of the area in which said vehicle may be located;
initiating narrow band transmission from said vehicle of a tone modulated signal,
receiving said modulated signal at said receiving stations, and
comparing the times of arrival of said modulated signal and a time reference signal to obtain range difference information so that the specific location of said vehicle within said area can be determined.

2. The method as set forth in claim 1 wherein said comparing step comprises
receiving a locally generated television signal,
deriving from said television signal said time reference signal, and
comparing said derived time reference signal with said received modulated signal to obtain range difference information from which said vehicle may be specifically located within said area.

3. The method as set forth in claim 2 comprising the additional steps of performing said receiving, deriving, and comparing steps at said receiving station, and
conveying said information from each receiving station to a central station where the specific vehicle location may be determined.

4. The method as set forth in claim 1 further comprising the steps of
generating a time reference signal, and
communicating said time reference signal to said receiving stations.

5. The method as set forth in claim 1 wherein said initiation is accomplished in response to voice request.

6. The method as set forth in claim 1 wherein said initiation is in response to an identification coded request.

7. The method as set forth in claim 1 wherein said initiation is accomplished automatically on a programmed basis.

8. The method as set forth in claim 1 wherein said initiation includes the step of
modulating a carrier frequency with a signal whose modulating wavelength is longer than the largest dimension of said area being served.

9. The method as set forth in claim 1 wherein the duration of said initiated transmission is on the order of 64 cycles of the modulating signal.

10. The method as set forth in claim 1 including the step of
providing a space dispersed antenna system for use with said receiving stations thereby minimizing the effects of multipath reflections.

11. The method as set forth in claim 10 wherein said providing step is performed at each receiving station.

12. The method as set forth in claim 1 including the step of determining the specific location of said vehicle within said area.

* * * * *